United States Patent
Muzammil et al.

(10) Patent No.: US 8,799,662 B2
(45) Date of Patent: Aug. 5, 2014

(54) METHOD AND APPARATUS FOR VALIDATING THE INTEGRITY OF INSTALLER FILES PRIOR TO INSTALLATION

(75) Inventors: Afroz Muzammil, New Dehli (IN); Piyush Gupta, Patiala (IN); Himanshu Garg, Jaipur (IN); Mansukh Patidar, Greater Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 83 days.

(21) Appl. No.: 13/559,781

(22) Filed: Jul. 27, 2012

(65) Prior Publication Data

US 2014/0032915 A1    Jan. 30, 2014

(51) Int. Cl.
*H04L 9/32*    (2006.01)

(52) U.S. Cl.
USPC .......................................................... 713/176

(58) Field of Classification Search
USPC .......................................................... 713/176
See application file for complete search history.

(56) References Cited

U.S. PATENT DOCUMENTS

| | | | |
|---|---|---|---|
| 6,964,008 B1* | 11/2005 | Van Meter, III | 714/807 |
| 7,149,789 B2* | 12/2006 | Slivka et al. | 709/219 |
| 7,761,606 B2* | 7/2010 | Sunder et al. | 709/250 |
| 8,074,280 B2* | 12/2011 | Fossen et al. | 726/23 |
| 8,171,469 B2* | 5/2012 | Elliott | 717/174 |
| 2005/0114338 A1* | 5/2005 | Borthakur et al. | 707/9 |
| 2006/0098110 A1* | 5/2006 | Yoshino et al. | 348/333.01 |
| 2007/0128899 A1* | 6/2007 | Mayer | 439/152 |
| 2010/0048170 A1* | 2/2010 | Jewsbury et al. | 455/411 |
| 2010/0149091 A1* | 6/2010 | Kota et al. | 345/156 |
| 2013/0028174 A1* | 1/2013 | Cabos | 370/316 |

\* cited by examiner

*Primary Examiner* — Kambiz Zand
*Assistant Examiner* — Aubrey Wyszynski
(74) *Attorney, Agent, or Firm* — Moser Taboada

(57) ABSTRACT

A method and apparatus for validating the integrity of computer software installer files prior to installation of computer software comprising: generating at least one signature file for at least one corresponding installer file, the at least one signature file comprising a file name, a file size and a checksum, wherein the checksum is calculated for the corresponding installer file; and packaging the at least one signature file with the corresponding installer file, wherein the checksum in the signature file is used to validate the integrity of the installer file prior to installation of the installer file.

20 Claims, 5 Drawing Sheets

METHOD AND APPARATUS FOR VALIDATING THE INTEGRITY OF INSTALLER FILES PRIOR TO INSTALLATION

BACKGROUND OF THE INVENTION

1. Field of the Invention

Embodiments of the present invention generally relate to installing application files and, more particularly, to method and apparatus for validating the integrity of installer files prior to installation of an application.

2. Description of the Related Art

With the availability of software applications for purchase and download from the Internet, software piracy has become an increasing problem. Software applications are typically associated with "installer files" (sometimes called "installer packages") that control the installation of a software application (typically comprising a plurality of files) on a user's computer. A purchaser may opt to install a less expensive version of the software application, often obtained, either knowingly or unknowingly, as the result of software piracy. A pirated version of a software application lacks integrity, i.e., faith in its expected flawless performance is diminished due to its unauthorized source, and is therefore more likely to either not launch, launch but operate improperly, or worse, crash the purchaser's computer. In addition, software updates and other purchaser support features for the pirated version of the software may fail because a valid (i.e., authorized) software application is not installed. Generally, the purchaser does not learn that the product is a pirated version at the time of application download or while beginning the installation of the application. Instead, the purchaser learns that the product is a pirated version while trying to resolve issues of the installer that may occur after the user has spent an hour or two of time on installation of the application (due, for example, to a long download time), when updates to the application fail, or when the purchaser calls customer support to get the issues resolved. Such issues or failure may cost the purchaser time and money.

Apart from authenticity of the installer files or installer packages, it is also possible that the software product itself is corrupted during downloading or transferring of the software application product from a source medium or network location to a destination. The corrupted software product may harm the destination medium on a destination machine. In some instances, a corrupted software product will begin installing the software product, but then fail to complete the installation. Accordingly, in a large organization where multiple software applications are used and maintained, each failure of an installer package may lead to loss of productivity for the organization, and in some cases may even harm computers of the organization.

Therefore, there is a need in the art for a method and apparatus for validating the integrity of computer software installer files (from both of an authenticity point of view as well as from a file corruption point of view) prior to the installation of computer software.

SUMMARY

Embodiments of the present invention generally relate to a method and apparatus for validating the integrity of computer software installer files prior to installation of computer software. In an embodiment, the method and apparatus generate at least one signature file for at least one corresponding installer file, the at least one signature file comprising a file name, a file size and a checksum, wherein the checksum is calculated for the corresponding installer file. The method and apparatus then package the at least one signature file with the corresponding installer file, wherein the checksum in the signature file is used to validate the integrity of the installer file prior to installation of the plurality of installer file.

Figure 1:
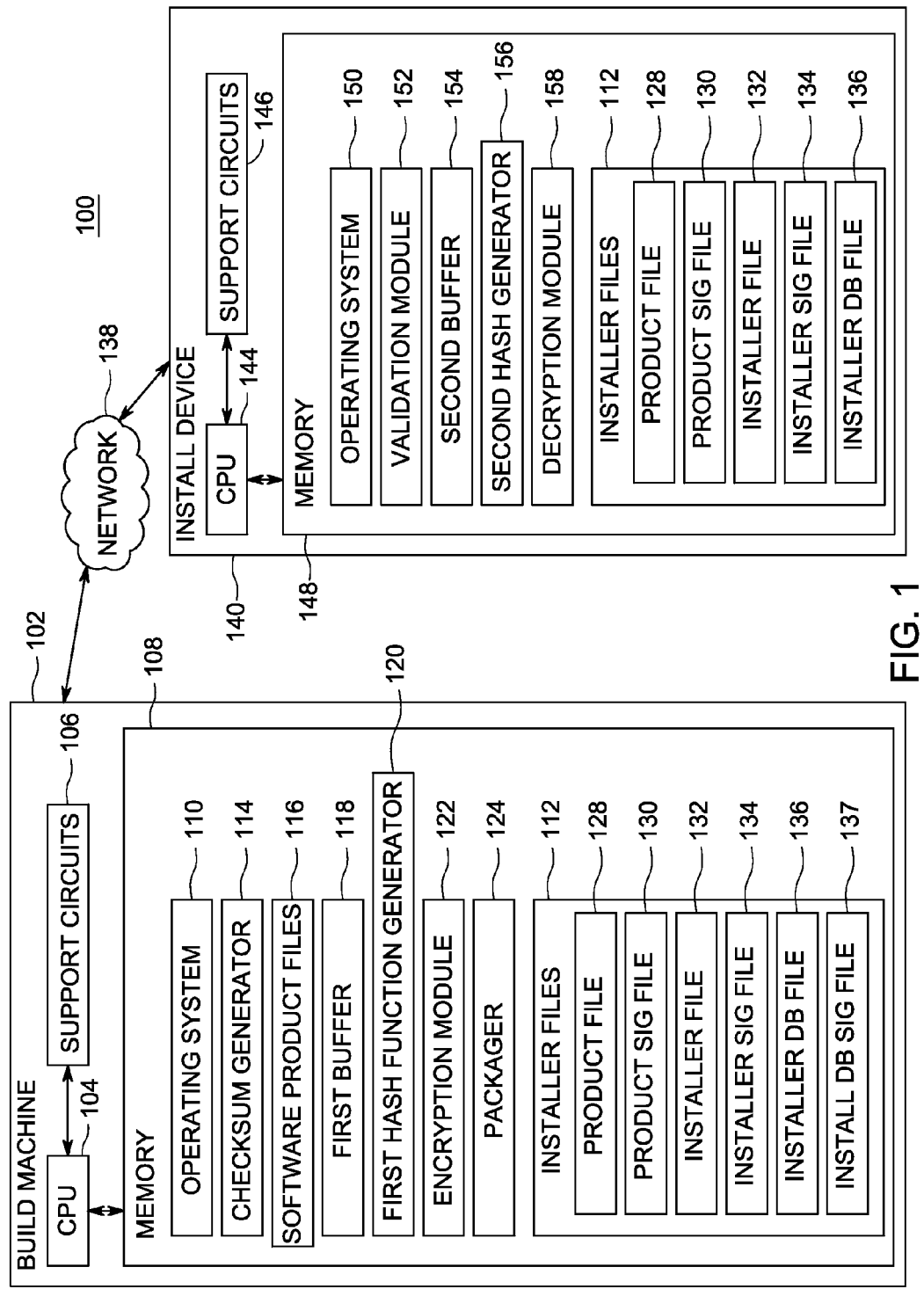
FIG. 1 depicts a block diagram of a system for validating the integrity of downloaded files prior to installation, according to one or more embodiments.

While the method and apparatus is described herein by way of example for several embodiments and illustrative drawings, those skilled in the art will recognize that method and apparatus for validating the integrity of installer files is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of method and apparatus for validating installer files defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments of the present invention comprise a method and apparatus for validating the integrity of installer files prior to installation. The files provided for installation of a software application product typically include the application files, an installer file, and possibly installer databases, cumulatively referred to hereafter as "installer files" and as an "installation package" when prepared for distribution to users. The embodiments determine the integrity of the installer files at the time of installation, that is, verifying both their authenticity and freedom from corruption. According to several embodiments, a signature file is created for at least one installer file at the time the installer files are packaged as a product for distribution or publication. Then, prior to installation on a user's computer, the integrity of one or more of the installer files is verified using one or more corresponding signature files. A signature file includes verification information about the installer files, and the installer files use the verification information to validate the integrity of the installer files, for example, within an installation package, prior to installation.

According to some embodiments, the installer files include zip format files for MICROSOFT® WINDOWS®, dmg format files for APPLE® MAC® computers, and corresponding installer databases. A signature file is created for at least one installer file. In some embodiments, a signature file is created for each installer file. The created signature file includes a file name corresponding to an installer file, file size information of the corresponding installer file and a validation code, for example an MD5 checksum generated using the corresponding installer file, for the at least one installer file. In some embodiments, the checksum is generated using a procedure modified to reduce the calculation time for the checksum. The term "MD5" (Message-Digest algorithm series 5 or MD5) refers to a widely used cryptographic hash function that produces a 128-bit (16-byte) hash value.

According to certain embodiments, the checksum is encrypted, for example, using an RSA private key available during the packaging of the installation package of the software product, and the encrypted checksum data is encoded, for example using Base64. The RSA private and public keys are components of public-key cryptography techniques known in the art, for example the RSA algorithm, and Base64 refers to a group of encoding schemes that represent binary data in ASCII string format. The RSA algorithm involves three steps, namely generation of a public key and a private key, encryption using the private key and decryption using the public key. According to several embodiments, the signature file includes the above-noted file name, the file size of the installer file corresponding to that file name, and the encrypted modified checksum generated as described above. The signature file is stored using an XML format.

At installation time, the installer uses the signature file to validate the integrity of the various installer files. According to some embodiments, the installer verifies that at least one signature file is included along with the installation package or installer files, and in some embodiments, the installer verifies that one signature file is included for each installer file. The installer then loads the signature file and compares its file name and file size to that of a corresponding installer file having the same file name. The installer also generates a checksum in the same way a checksum was created for the signature file, and after decryption of the checksum included in the signature file, compares the calculated checksum to the checksum included in the signature file. If the checksum in the signature file equals the calculated checksum, the validity of the integrity of the installer file is determined. If the installer files are found to be invalid, meaning the checksums are not equal, the installer does not allow installation of the software.

Advantageously, because the checksum is performed on less than an entire file, embodiments of the invention ensure negligible increase in processing time to perform the added validations.

Various embodiments of a method and apparatus for validating the integrity of installer files are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for validating the integrity of installer files prior to installation, according to one or more embodiments. The system 100 comprises a build machine 102, and an install device 140 communicably coupled through a communication network 138. According to some embodiments, the build machine 102 builds an installation package with one or more installer files, for example, for installing a software product. The build machine 102 comprises a CPU 104, support circuits 106, and a memory 108. The CPU 104 may comprise one or more commercially available microprocessors or microcontrollers that facilitate data processing and storage. The support circuits 106 facilitate the operation of the CPU 104 and include one or more clock circuits, power supplies, cache, input/output circuits, and the like. The memory 108 comprises at least one of Read Only Memory (ROM), Random Access Memory (RAM), disk drive storage, optical storage, removable storage and/or the like. The memory 108 comprises an operating system 110, installer files 112, a checksum generator 114, software product files 116, a first buffer 118, a first hash function generator 120, an encryption module 122, and a packager 124. The installer files 112 comprise a product file 128, a product signature file 130, an installer file 132, an installer signature file 134, an installer database file 136, and an installer database signature file 137.

According to some embodiments, software product files 116 are installed on the install device 140 using the installer files 112. The install device 140 comprises a CPU 144, support circuits 146, and a memory 148. The CPU 144 may comprise one or more commercially available microprocessors or microcontrollers that facilitate data processing and storage. The support circuits 146 facilitate the operation of the CPU 144 and include one or more clock circuits, power supplies, cache, input/output circuits, and the like. The memory 148 comprises at least one of Read Only Memory (ROM), Random Access Memory (RAM), disk drive storage, optical storage, removable storage and/or the like. The memory 148 comprises an operating system 150, installer files 112, a validation module 152, a second buffer 154, a second hash function generator 156, and a decryption module 158. The installer files 112 comprise a product file 128, a product signature file 130, an installer file 132, an installer signature file 134, and an installer database file 136.

In various embodiments, the network 138 may include one or more networks including but not limited to Local Area Networks (LANs) (e.g., an Ethernet or corporate network), Wide Area Networks (WANs) (e.g., the Internet), wireless data networks, some other electronic data network, or some combination thereof.

The validation module 152 verifies the integrity of the installer files 112. In general, installer files 112, for example, from an ADOBE® CREATIVE SUITE® installer package, contains various files, such as ZIP format on WINDOWS® or a DMG format on MAC®, and installer databases for at least one of WINDOWS® and MAC®. The packager 124 packages software product files 116 (e.g. an executable file, a readme file, and the like) into a first file format, such as ZIP or DMG, along with other supporting installer files into a second file format, such as DB. The packager 124 creates a signature file 130, 134, 137 for each of the installer files 112 and stores the signature file 130, 134, 137 with the installer files.

At the time of packaging, the checksum generator 114 facilitates generation of at least one signature file for each of the installer files 128 and 130. The checksum generator 114 divides of each of the installer files 112 into a number of segments. The checksum generator 114 extracts data from each of the segments to generate data chunks corresponding to each of the segments, and then concatenates the data chunks in a first buffer 118.

The checksum generator 114 implements the first hash function generator 120. The first hash function generator 120 calculates a first hash checksum for the data in first buffer 118. For example, if the installer file size is 100 MB, the checksum generator 114 may divide the file into 100 segments of 1 MB each. The checksum generator 114 then extracts a data chunk of, for example, the first 4 KB of each segment, reads the chunks into the first buffer 118. In this example, the first buffer 118 is only 400 KB (i.e. 4 KB*100) in size. The first hash function generator 120 calculates the MD5 checksum of the first buffer 118, which is only 400 KB (i.e. 4 KB*100) in size. The calculation of the MD5 checksum of the first buffer 118 is faster than computing an MD5 checksum of a complete installer file of size 100 MB.

In some embodiments, the division of a file into segments is dependent upon the size of the file, i.e. for small files, the size of the segment is smaller and for large files, the segment size is larger. For example, if the file is less than 1 MB, then a checksum using the complete file may be calculated. If the file size is between 1 MB and X MB, wherein X>1 MB, then the file may be divided into segments of size, for example, 100 KB and the size of the chunk to read into the first buffer 118 may be 4 KB for each segment. If the file size is more than X MB, the size of the chunk may be, for example, 1 MB and data inserted into the buffer may be, for example, 4 KB for each 1 MB chunk.

Table 1 is a tabular representation of one embodiment for the division of a file into segments and the segments into chunks. As shown in the Table 1, there are three columns each for one attribute of files, segments and chunks, namely File Size, Segment Size and Chunk Size where L=the file size in bytes.

TABLE 1

| FILE SIZE (L BYTES) | SEGMENT SIZE | CHUNK SIZE |
|---|---|---|
| L <= 1 MB | L | L |
| 10 MB < L <= 100 MB | 100 KB | 4 KB |
| 100 MB < L | 10 MB | 4 KB |

The encryption module 122 encrypts the first hash checksum to secure the first hash checksum. Specifically, the encryption module 122 encrypts the first hash checksum with an RSA private key, which is present only at the build machine 102, during the time of building the installer. The checksum generator 114 stores the encrypted checksum data into the signature files 130,134.

In some embodiments, the checksum generator 114 facilitates BASE 64 encoding of the encrypted hash data to write to an XML file along with other attributes of the file. The BASE64 encoding is used to convert binary data into text form so as to write the content in a plain XML file. The term "BASE64" refers to a group of similar encoding schemes that represent binary data in an ASCII string format by translating it into a radix-64 representation. The Base64 term originates from a specific MIME content transfer encoding.

Upon receipt of the installer files 112 on the install device 140, the decryption module 158 facilitates self-verification of the installer files before installation. The decryption module 158 verifies the RSA private key on the installer file 132 by matching it to an RSA public key using key verification methods known in the art. Upon successful verification of the installer file 132, the validation module 152 accesses the corresponding signature file for the remaining installer files 112. The validation module 152 verifies a signature file exists for each installer file 112, verifies that the name of the signature file matches the name of the corresponding installer file, verifies that the files size of the corresponding installer file matches the file size provided in the signature file, and finally generates a checksum of the corresponding installer file as previously described and compares the generated checksum with a decrypted version of the checksum stored in the signature files. If the file name, file size, and checksum match for all installer files, the installer successfully verifies the integrity of the installer files and installation may proceed.

Figure 2:
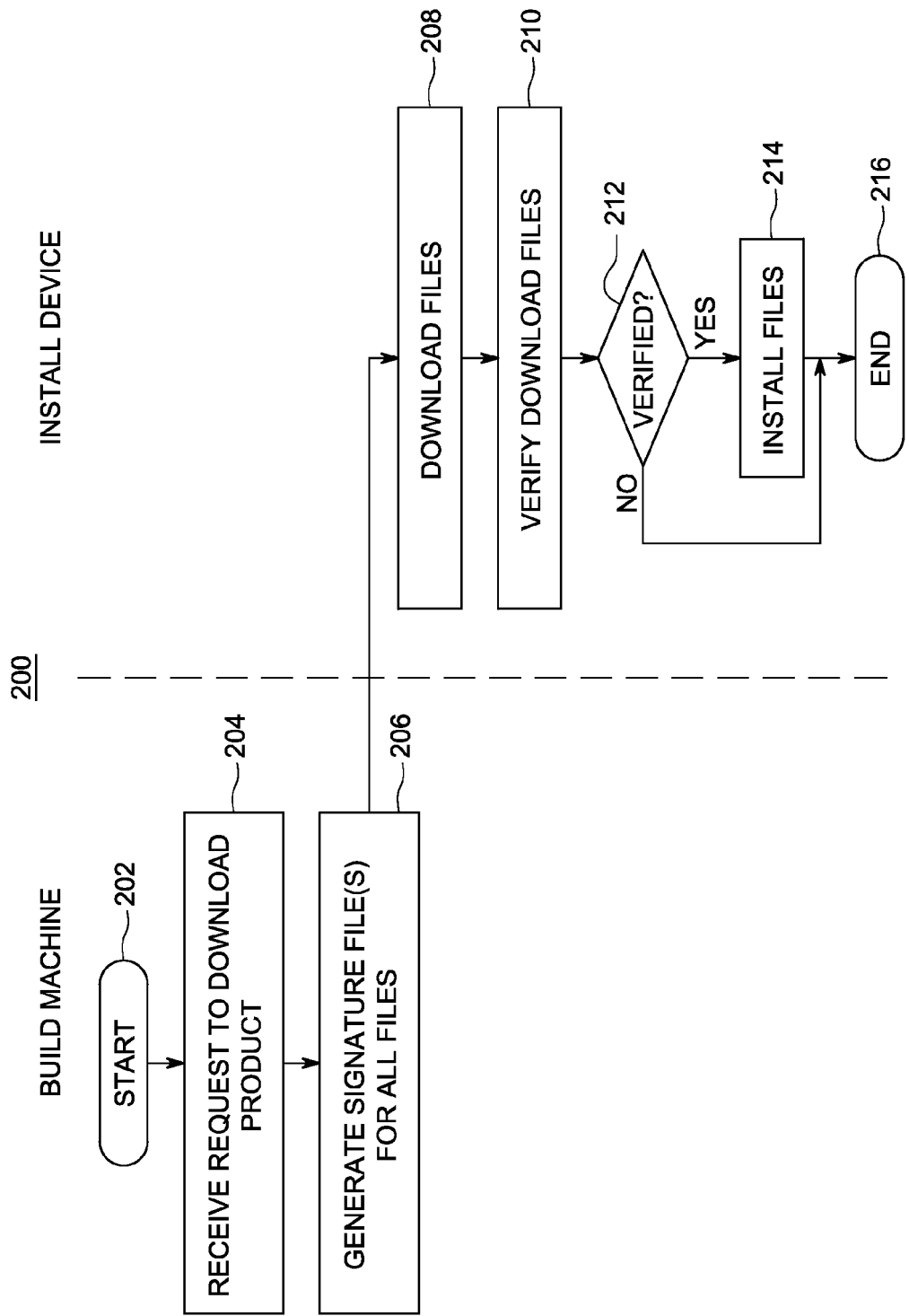
FIG. 2 depicts a flow diagram of a method for validating the integrity of download files prior to installation as performed by the system of FIG. 1, according to one or more embodiments.

FIG. 2 depicts a flow diagram of a method 200 for validating the integrity of download files prior to installation as performed by the system 100 of FIG. 1, according to one or more embodiments. The method 200 generates a signature file for each installer file and verifies the signature files prior to installation.

The method 200 starts at step 202 and proceeds to 204. At step 204, the method 200 receives a request to download a product. A product download may contain a number of installer files, such as zip format files for MICROSOFT® WINDOWS®, dmg format files for APPLE® MAC® computers, and corresponding installer databases. For illustration purposes, the installer files are named Asset1_1.zip and install.db. The method 200 proceeds to step 206, where the method 200 generates a signature file for each of the files in the product download. For example, the method 200 generates two signature files namely Asset1_1.sig and install.sig. as described in further detail with respect to FIG. 3 below. The method 200 proceeds to step 208, where the method 200 downloads the installer files onto an install device. The method 200 proceeds to step 210, where the method 200 validates the integrity of the product download files for installation as described in further detail with respect to FIG. 4 below. The method 200 proceeds to step 212, where the method 200 determines whether the integrity of the product download was successfully verified. If the method 200 determines the integrity of the product download was not successfully verified, the method 200 proceeds to step 216. However, if at step 212, the method 200 determines the integrity of the product download was successful, the method 200 proceeds to step 214, where the method 200 installs the files on the computer as per the installation process proscribed by the installer files. The method 200 proceeds to step 216 and ends.

Figure 3:
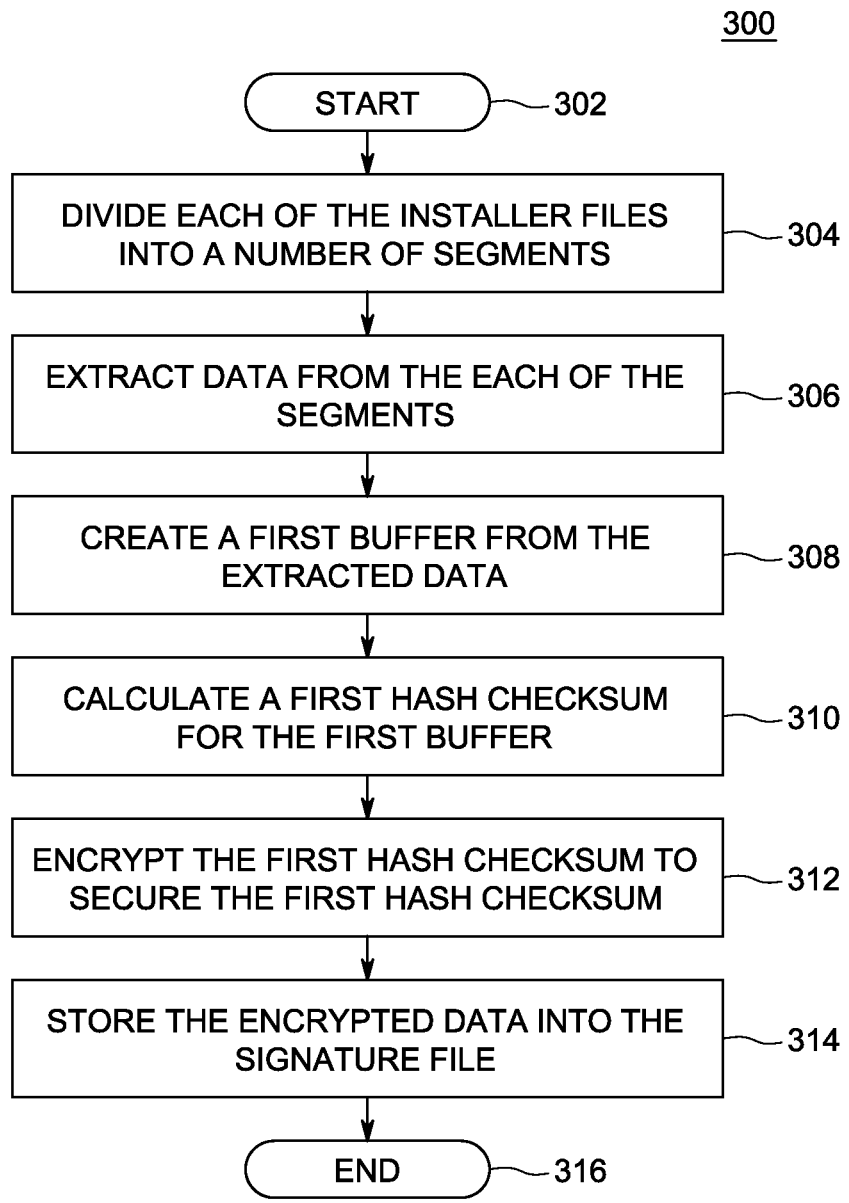
FIG. 3 depicts a flow diagram of a method for generating a signature file for an installer file, as performed by the packager of FIG. 1, according to one or more embodiments.

FIG. 3 depicts a flow diagram of a method 300 for generating a signature file for an installer file, as performed by the packager 124 of FIG. 1, according to one or more embodiments. The method 300 is performed on each installer file.

The method 300 starts at step 302 and proceeds to step 304. At step 304, the method 300 divides the installer file into segments of a predefined size, for example, 1 megabyte (MB) each. The method 300 proceeds to step 306, where the method 300 extracts the first N kilobytes (KB) of data from each of the segments, for example, the first 4 KB of data, from each segment. The method 300 proceeds to step 308, where the method 300 creates a first buffer from the 4 KB of data extracted from each of the segments. The method 300 proceeds to step 310, where the method 300 calculates an MD5 checksum for the data of the first buffer, wherein the checksum is used to generate the validation code as noted above.

The method 300 proceeds to step 312, where the method 300 encrypts the hash checksum to secure the hash checksum. The method 300 encrypts the hash with a RSA private key that is present only at machines during the building of the installer and thereafter is not available. The method 300 proceeds to step 314, where the method 300 stores the encrypted data in the signature file as the validation code. The signature file is stored with the same name as the corresponding installer file, however, the signature file comprises a .sig file extension, for example, a signature file for an installer file named Asset1__1.zip will be named Asset1__1.sig: An example of a signature file for Asset1__1.zip may be:

```
<Signature version='1.0'>
    <FileName>Asset1__1.zip</FileName>
    <FileSize>1206593924</FileSize>
    <Checksum>X2KPI3r+ahroDmY3PieU15ZfdvUDNcTwVskpRxGZ1/
jPorj+TNZjHsInLsOVri0E5fOFwR1a6gU+oFBkTBqLqq4ZsSGrbr
</Shceckesum>
    </Signature>
```

The method 300 proceeds to step 316 and ends.

Figure 4:
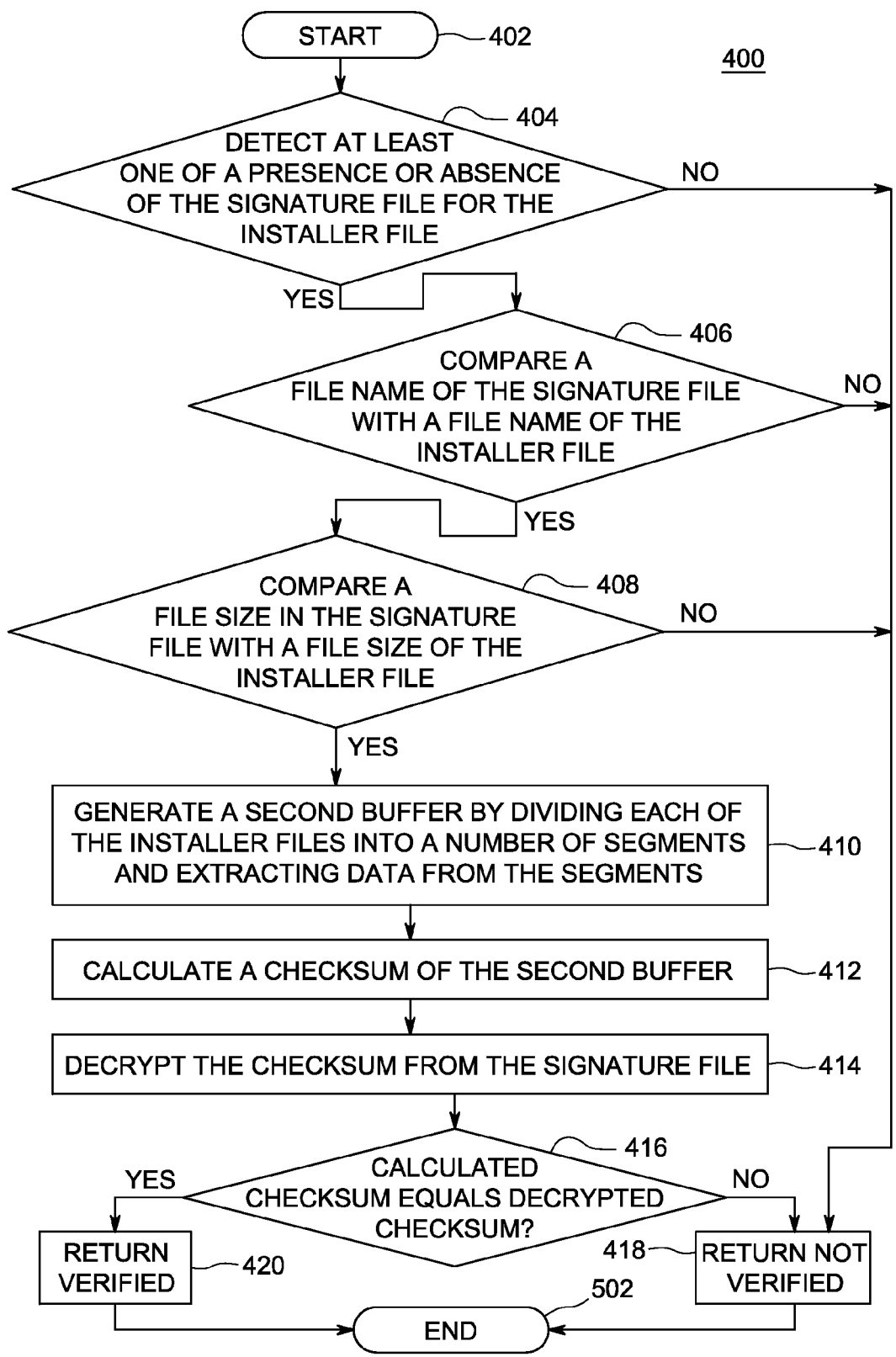
FIG. 4 depicts a flow diagram of a method for validating the integrity of each installer file, as performed by a validation module of FIG. 1, according to one or more embodiments.

FIG. 4 depicts a flow diagram of a method 400 for validating the integrity of each installer file, as performed by the validation module 152 of FIG. 1, according to one or more embodiments. The method 400 compares the information in the signature file against the corresponding installer file to validate the validity of the installer file.

The method 400 starts at step 402 and proceeds to step 404. At step 404, the method 400 determines whether a signature file exists for the installer file. For example, if an installer file is named Asset1.zip, the method 400 determines whether there is a corresponding signature file named Asset1.sig. If the method 400 determines that the signature file does not exist, then the method 400 proceeds to step 418. However, if at step 404, the method 400 detects that the signature file is present, the method 400 proceeds to step 406.

At step 406, the method 400 determines whether the file name in the signature file matches the file name of the installer file. If the file name of the signature file does not match with the file name of the installer file, the method 400 proceeds to step 418. However, if the file name of the signature file matches with the file name of the installer file, the method 400 proceeds to step 408, where the method 400 determines whether the file size in the signature file matches the file size of the installer file. If the file size of the signature file does not match the file size of the installer file, the method 400 proceeds to step 418. However, if the file size of the signature file matches with the file size of the installer, the method 400 proceeds to step 410.

At step 410, the method 400 generates a second buffer by dividing each of the installer files into a number of segments and extracts data from the segments, as similarly described in steps 304, 306, and 308 for FIG. 3 above. The method 400 proceeds to step 412, where the method 400 calculates a checksum of the second buffer. The method 400 proceeds to step 414, where the method 400 decrypts the checksum from the signature file. The checksum is decrypted using a RSA public key. The method 400 proceeds to step 416, where the method 400 determines whether the calculated checksum is equal to the decrypted checksum from the signature file. If the calculated checksum is not equal to the decrypted checksum from the signature file, the method 400 proceeds to step 418. At step 418, the method 400 returns "not verified", meaning the install files were not successfully validated. The method 400 proceeds to step 422. However, if at step 416, the method 400 determines the calculated checksum matches the decrypted checksum from the signature file, the method 400 proceeds to step 420. At step 420, the method 400 returns that the integrity of the install files are verified. The method 400 proceeds to step 422 and ends.

While the method 400 has been illustrated with the embodiment depicted in FIG. 4, in several embodiments, the sequence for various method steps is different. For example, in certain embodiments, the comparison between the first hash checksum and the second hash checksum is made before the comparison of the file name or the file size. All such embodiments are included within the scope and spirit of the present invention.

According to several embodiments, prior to validating the install files, the method 400 validates the installer for authenticity. When the user runs the installer via media or electronic download, the method 400 first validates the installer's contents using the RSA public key, and in case of an error, for example, if the binaries are corrupted, the method 400 does not launch the installer, and notifies the user of an error, for example, that the installer is corrupted.

Thus, according to certain embodiments, various embodiments disclosed herein prevent tampering of the installer file, by virtue of having encrypted content in the signature file. According to several embodiments, installer files corrupted during download or transmission, would be prevented from installation because the signature file verification would fail.

In some embodiments, the system facilitates detection of tampered installer files. For example, in certain scenarios, a user may attempt to tamper with an installer file. In order to so the user must decompress, i.e., unzip, one or more compressed installer files, i.e. Asset1__1.zip, and replace a binary file, a file containing data encoded in binary form, in the installer files with a tampered file and compress again. However, the user fails to generate a signature file, i.e., a user generated signature file, for the installer files, as the original signature file has an encrypted value. The encryption is only done if a private key is known. Hence, at the install time, the validation fails, as the corresponding signature file, i.e., the user generated and original installer file, fail to match.

Advantageously, in some embodiments, the system 100 facilitates reduction of piracy as there is no way to misrepresent the installer files. Further, the system 100 facilitates troubleshooting in case of failure of installation due to failure of verification of installation files using a corresponding given signature file. For example, a user knows that an installer package is corrupted or tampered and a fresh copy of the installer needs to be procured. The system 100 is scalable, easily maintainable, and efficient compared to existing solutions. This system 100 and the method thereof is also extendable to any and all other installers.

The embodiments of the present invention may be embodied as methods, system, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
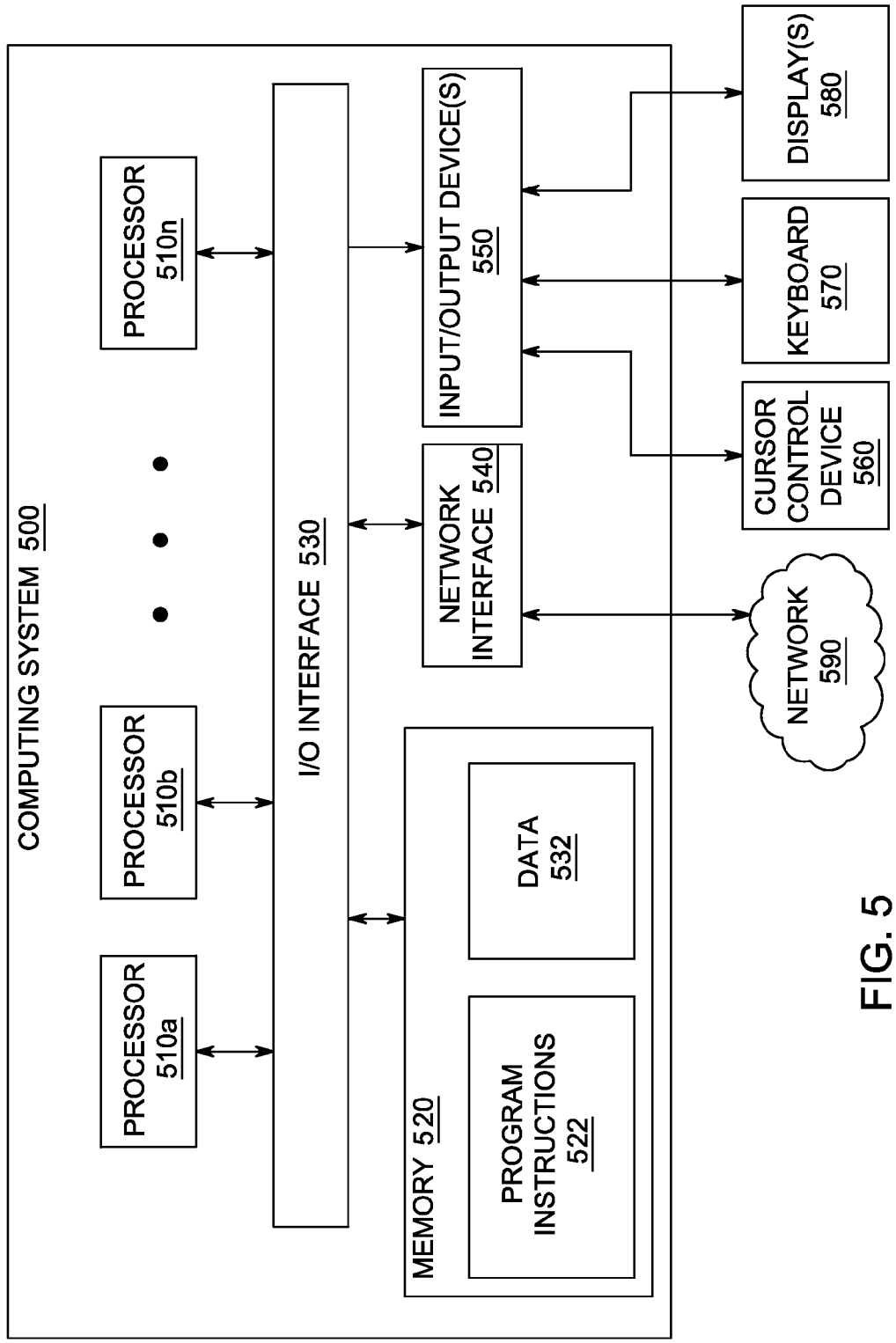
FIG. 5 depicts a computer system that is a computing device and can be utilized in various embodiments of the present invention, according to one or more embodiments.

FIG. 5 depicts a computer system that is a computing device and can be utilized in various embodiments of the present invention, according to one or more embodiments.

Various embodiments of method and apparatus for validating installer files, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200, 300 and 400, as processor-executable executable program instructions 522 (e.g., program instructions executable by processor(s) 510$a$-$n$) in various embodiments.

In the illustrated embodiment, computer system 500 includes one or more processors 510$a$-$n$ coupled to a system memory 520 via an input/output (I/O) interface 530. The computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510$a$-$n$ may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510a-n may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowchart of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
generating at least one signature file for at least one corresponding installer file, the at least one signature file comprising a checksum, wherein the checksum is calculated for the at least one corresponding installer file by dividing the at least one corresponding installer file into a plurality of segments, extracting data from each of the segments in the plurality of segments, calculating a first hash checksum from the extracted data, and storing the first hash checksum in the at least one signature file; and
packaging the at least one signature file with the at least one corresponding installer file,
wherein the checksum in the signature file is used to validate the integrity of the at least one corresponding installer file prior to installation of the at least one corresponding installer file.

2. The method of claim 1, wherein generating the at least one signature file for the at least one corresponding installer file comprises:
creating a first buffer from a concatenation of the extracted data;
calculating the first hash checksum for the first buffer;
encrypting the first hash checksum to secure the first hash checksum; and
storing the encrypted first hash checksum in the at least one signature file.

3. The method of claim 1, wherein the at least one signature file comprises a file name, and the at least one signature file for a corresponding installer file comprises a same name as the corresponding installer file and a .sig file name extension.

4. The method of claim 1, wherein the checksum is an MD5 checksum.

5. The method of claim 1, wherein the checksum is encrypted with RSA public key encryption.

6. The method of claim 1, wherein the signature file, which also comprises a file name and file size, is used to validate the integrity of the at least one corresponding installer file by:
detecting at least one of a presence or absence of a signature file for the corresponding installer file;
comparing a file name in the signature file with a file name of the corresponding installer file;
comparing a file size in the signature file with a file size of the corresponding installer file; and
comparing a checksum in the signature file with a checksum of the corresponding installer file.

7. The method of claim 6, wherein comparing a checksum in the signature file with a checksum of the corresponding installer file comprises:
generating a second buffer by dividing each of the installer files into a plurality of segments and extracting data from each of the segments;
calculating a checksum of the second buffer;
decrypting the checksum from the signature file; and
comparing the calculated checksum with the decrypted checksum from the signature file.

8. The method of claim 1, wherein a respective one of a plurality of signature files is used for validating each of a corresponding plurality of installer files.

9. An apparatus for generating installer files comprising:
a checksum generator module for generating at least one signature file for a corresponding one of a plurality of the installer files, the at least one signature file comprising a file name, a file size and a checksum;
the checksum generator module comprising:
a first buffer comprising a concatenation of data chunks extracted from each of a number of sequential segments that divide a corresponding installer file;
a first hash function generator for calculating a first hash checksum for the data of the first buffer; and
an encryption module for encrypting the first hash checksum to secure the first hash checksum in the signature file; and
a packager for packaging the at least one signature file with the corresponding installer file.

10. The apparatus of claim 9, wherein the signature file may be used to validate the integrity of the corresponding installer file by:
detecting at least one of a presence or absence of a signature file for the corresponding installer file;
comparing a file name in the signature file with a file name of the corresponding installer file;
comparing a file size in the signature file with a file size of the corresponding installer file; and
comparing a checksum in the signature file with a checksum of the corresponding installer file.

11. The apparatus of claim 10, wherein comparing a checksum in the signature file with a checksum of the corresponding installer file comprises:
generating a second buffer by dividing each of the installer files into a plurality of segments and extracting data from each of the segments;
calculating a checksum of the second buffer;
decrypting the checksum from the signature file; and
comparing the calculated checksum with the decrypted checksum from the signature file.

12. The apparatus of claim 9, wherein the checksum is an MD5 checksum encrypted with RSA public key encryption.

13. A computer implemented method for validating the integrity of computer software installer files prior to installation of computer software comprising:
receiving a package having at least one signature file with at least one corresponding installer file for implementing installation of computer software;
detecting a checksum in the at least one signature file; and
validating the integrity of the at least one installer file prior to installation of the installer file by
dividing the at least one corresponding installer file into a plurality of segments,
extracting data from each of the segments in the plurality of segments,
calculating a first hash checksum from the extracted data, and
comparing the first hash checksum to the checksum detected in the corresponding signature file; and
validating the integrity of the at least one corresponding installer file by comparing the first hash checksum to the checksum detected in the corresponding signature file.

14. The computer implemented method claim 13, wherein validating the integrity of the at least one corresponding installer file further comprises:
creating a first buffer from a concatenation of the extracted data;
calculating the first hash checksum for the first buffer;
decrypting the hash checksum detected in the corresponding signature file; and comparing the first hash checksum to the decrypted checksum from the corresponding signature file.

15. The computer implemented method of claim 13, wherein the at least one signature file comprises a file name, and the at least one signature file for a corresponding installer file comprises a same name as the corresponding installer file and a .sig file name extension.

16. The computer implemented method of claim 13, wherein the checksum is an MD5 checksum.

17. The computer implemented method of claim 13, wherein the checksum detected in the at least one signature file is encrypted with RSA public key encryption.

18. The computer implemented method of claim 13, wherein the at least one signature file comprises a file name, and wherein validating the integrity of the at least one corresponding installer file further comprises:
    comparing a file name in the signature file with a file name of the corresponding installer file.

19. The computer implemented method of claim 18, wherein the at least one signature file comprises a file size, and wherein validating the integrity of the at least one corresponding installer file further comprises:
    comparing a file size in the signature file with a file size of the corresponding installer file.

20. The computer implemented method of claim 13, wherein a respective one of a plurality of signature files is used for validating each of a corresponding plurality of installer files.

* * * * *